US012005279B2

(12) United States Patent
Favre et al.

(10) Patent No.: US 12,005,279 B2
(45) Date of Patent: Jun. 11, 2024

(54) PROTECTIVE BARRIER FOR INDUSTRIAL EQUIPMENT

(71) Applicant: L'Air Liquide Société Anonyme pour l'Etude et l'Exploitation des Procédés Georges Claude, Paris (FR)

(72) Inventors: Arnaud Favre, Marin (FR); Remy Kurtz, Cracow (PL)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 43 days.

(21) Appl. No.: 17/715,312

(22) Filed: Apr. 7, 2022

(65) Prior Publication Data

US 2022/0323800 A1 Oct. 13, 2022

(51) Int. Cl.
*A62C 2/06* (2006.01)
*A62C 3/06* (2006.01)
*E04D 13/17* (2006.01)

(52) U.S. Cl.
CPC .................. *A62C 2/06* (2013.01); *A62C 3/06* (2013.01); *E04D 13/17* (2013.01)

(58) Field of Classification Search
CPC .... A62C 2/06; A62C 3/06; E04H 5/02; E04H 9/00–16; E04B 1/92; F17C 13/12–126; F17C 2203/0626; F17C 2203/0631
See application file for complete search history.

(56) References Cited

U.S. PATENT DOCUMENTS

| | | | | |
|---|---|---|---|---|
| 7,469,506 | B2 * | 12/2008 | Hosey | E04B 7/166 52/72 |
| 9,709,370 | B1 * | 7/2017 | Keller | B65D 55/02 |
| 10,072,918 | B2 * | 9/2018 | Keller | B65D 47/32 |

(Continued)

FOREIGN PATENT DOCUMENTS

| | | |
|---|---|---|
| DE | 41 06 810 | 9/1992 |
| FR | 1 245 592 | 10/1960 |

(Continued)

OTHER PUBLICATIONS

Oxygen compressor installation and operation guide, a standard for current industrial practices for oxygen compressor installations, operations, maintenance, and safety, publication No. G-4.6 (2014), published by the Compressed Gas Association, 4221 Walney Road, 5th Floor, Chantilly, Va. 20151-2923 Doc 10/17.

(Continued)

*Primary Examiner* — Adriana Figueroa
(74) *Attorney, Agent, or Firm* — Elwood L. Haynes

(57) ABSTRACT

Protective barrier for an item of industrial equipment that is traversed by and/or processes a combustible fluid or oxygen, having four vertical walls forming four sides of a parallelepiped, these walls being attached to a base so as to define a rectangular-section space that is intended to contain the industrial equipment arranged on the base, the four vertical walls having a height of at least 2.4 m and having at least one partial roof attached to at least one of the vertical walls, having a surface parallel to the base and extending over the space, the surface area of the partial roof or the surface area of each of the partial roofs being equal to at most 50% of the surface area corresponding to the rectangular section.

13 Claims, 4 Drawing Sheets

(56) References Cited

U.S. PATENT DOCUMENTS

| | | | | |
|---|---|---|---|---|
| 10,704,284 | B2 * | 7/2020 | Harada | E04H 9/024 |
| 2019/0168961 | A1 | 6/2019 | Keller | |

FOREIGN PATENT DOCUMENTS

| | | | | | |
|---|---|---|---|---|---|
| JP | 07101316 | A | * | 4/1995 | E04H 5/02 |
| JP | 2006022506 | A | * | 1/2006 | |
| JP | 2008057185 | A | * | 3/2008 | |
| JP | 2016199917 | A | * | 12/2016 | |

OTHER PUBLICATIONS

French Search Report for corresponding FR 2103527, dated Dec. 14, 2021.

* cited by examiner

PROTECTIVE BARRIER FOR INDUSTRIAL EQUIPMENT

CROSS REFERENCE TO RELATED APPLICATIONS

This application claims the benefit of priority under 35 U.S.C. § 119 (a) and (b) to French Patent Application No. 2103527, filed Apr. 7, 2021, the entire contents of which are incorporated herein by reference.

BACKGROUND

The present invention relates to a protective barrier for an item of industrial equipment.

Barriers for guarding against fire and/or spattering of molten metal and/or flying fragments are used in industrial installations where oxygen or at least one combustible fluid, such as hydrogen, methane, acetylene, ammonia, propane, propylene, are present.

These barriers may be made of concrete, reinforced concrete, steel or cement.

For example, apparatus for separating air or other gaseous mixtures by cryogenic distillation operate at high pressures and are connected to potentially dangerous equipment in which a combustible fluid or oxygen circulates. This equipment must be protected by barriers. The main aim of a safety barrier is to protect personnel from accidents. A secondary objective is to prevent or reduce damage to adjacent equipment. The barriers associated with oxygen or hydrogen operations are of particular importance. Oxygen explosions and/or fires are very different, in terms of temperature and intensity, to those in a petroleum refinery or a petrochemical factory. In refinery or petrochemical fires, the fuel is at least one hydrocarbon which escapes through the metal such as pipes and tanks, and temperatures can reach 980° C. In an oxygen fire, the fuel is the metal itself. These fires produce extremely high temperatures, of 3000° C. and above.

Thus, in general, there are three types of mechanical forces to be taken into account when designing a barrier: (i) the force of a jet resulting from a discharge of compressible fluid from a hole in a compressor casing or pipework accompanied by molten metal from a hole, (ii) elevated pressure or a blast force resulting from a massive release of stored energy, such as a storage unit for oxygen or hot combustion gases, and (iii) a force resulting from the impact of steel fragments travelling at high speed owing to an explosion. Furthermore, the design of a safety barrier for withstanding an oxygen fire must allow this barrier to withstand thermal loads of 3000° C. at the location of the metal combustion, and spattering of molten metal.

"Oxygen Compressor Installation and Operation Guide, a standard for current industrial practices for oxygen compressor installations, operations, maintenance, and safety, publication number G-4.6 (1992)" published by the Compressed Gas Association ("CG"), 4221 Walney Road, 5th Floor, Chantilly, Va. 20151-2923 Doc 10/17 describes an enclosure for an oxygen compressor, the enclosure having vertical walls with a minimum height of 2.4 m, and being uncovered or having a partial roof. This document underlines the importance of ventilation to avoid oxygen concentrating around the compressor, and suggests that the fact that the enclosure is uncovered is sufficient to ensure this ventilation.

SUMMARY

One aim of the present invention is to reduce the distance to which fragments and/or molten metal can be thrown owing to an explosion, and/or to limit the propagation of a flame. In this way, it becomes possible to arrange other equipment, and/or to permit the presence of a person, closer to the barrier without this presenting a safety risk.

According to another aim of the invention, the ventilation inside the barrier is to be improved.

DE4106810A1 describes a barrier as known in the art.

The invention provides, on one hand, a protective barrier for an item of industrial equipment that is traversed by and/or processes a combustible fluid or oxygen, comprising four vertical walls forming four sides of a parallelepiped, these walls being attached to a base so as to define a rectangular-section space that is intended to contain the industrial equipment arranged on the base, the four vertical walls having a height of at least 2.4 m and comprising at least one partial roof attached to at least one of the vertical walls, having a surface parallel to the base and extending over the space, the surface area of the partial roof or the surface area of each of the partial roofs being equal to at most 50%, preferably at most 30%, of the surface area corresponding to the rectangular section, characterized in that a first wall of the four walls, whose length is that of the barrier, is attached to a first partial roof and the height of a second of the four walls or of a partition is greater than that of the first wall, the second wall or the partition being parallel to the first wall.

According to other optional aspects:

- the barrier comprises the industrial equipment contained in the rectangular space.
- the barrier comprises the industrial equipment, arranged at least in part, preferably having at least 50% of its footprint below the partial roof or one of the partial roofs,
- the industrial equipment is entirely beneath the partial roof.
- the industrial equipment is beneath only one of the partial roofs.
- the industrial equipment is beneath the lowest of at least two partial roofs at different elevations.
- at least 50% of the section of the space is uncovered.
- the four walls and/or the at least one partial roof are made of concrete, preferably reinforced concrete, or cement or steel.
- the width of the open space of the roof of the barrier is greater than 0.75H, where H is the height of at least three walls of the barrier.
- three of the vertical walls have the same height.
- one of the vertical walls is taller than the others.
- at least one partial roof is a planar plate having a rectangular section.
- at least one partial roof has an edge connected to a wall of the barrier.
- at least one partial roof has three edges, each connected to a different wall of the barrier.
- a second partial roof is attached to the top of the second wall, the first and second partial roofs being positioned above the space formed by the four walls.
- a second partial roof is attached to the top of the partition, the first and second partial roofs being positioned above the space formed by the first wall, part of two of the other four walls and of the partition.
- the first partial roof is positioned at a lower height than the second partial roof.
- the barrier comprises the industrial equipment contained in the rectangular space, where the equipment is a compressor, a pump, a valve, a duct or a storage unit.
- at least one partial roof has a rectangular surface.

the barrier is positioned next to an apparatus in such a way that a fire and/or a spatter of molten metal from the industrial equipment and/or a fragment of the industrial equipment cannot reach the apparatus.

the partial roofs have substantially the same width.

the horizontal separation D between the free ends of two partial roofs above the rectangular section corresponds to between 25 and 75%, or even between 30 and 40% of the width W of the rectangular section.

The invention also provides an installation comprising at least two protective barriers for an item of industrial equipment that is traversed by and/or processes a combustible fluid or oxygen, each comprising four vertical walls forming four sides of a parallelepiped, these walls being attached to a base so as to define a rectangular-section space that is intended to contain the industrial equipment arranged on the base, the four vertical walls having a height of at least 2.4 m and comprising at least one partial roof attached to at least one of the vertical walls, having a surface parallel to the base and extending over the space, the surface area of the partial roof or the surface area of each of the partial roofs being equal to at most 50%, preferably at most 30%, of the surface area corresponding to the rectangular section, the at least two barriers having a common wall, each barrier being intended to contain an item of industrial equipment that is traversed by and/or processes a combustible gas or oxygen, the common wall being parallel to a wall of each of the at least two barriers and being higher than the at least two walls to which it is parallel.

Preferably:

the installation comprises two partial roofs attached to a common wall.

the two partial roofs are at the same height.

The installation may comprise two items of industrial equipment, each in the rectangular space of one of the two barriers.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
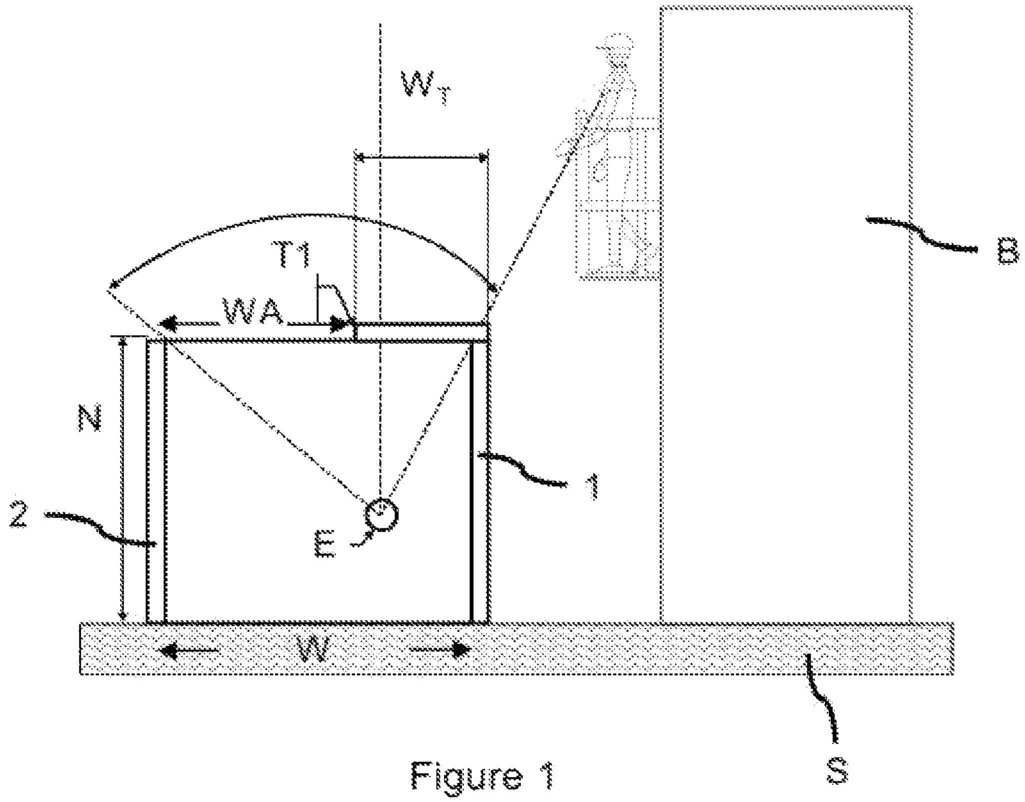
FIG. 1 shows a section through a protective barrier for an item of industrial equipment.

FIG. 1 shows a section through a protective barrier for an item of industrial equipment E. The item of industrial equipment E may be traversed by a combustible fluid (gas or liquid), or liquid or gaseous oxygen. It may also process the fluid in question. The equipment E may for example be a compressor, a pump, a valve, a duct or a storage unit. The pressure of the fluid in question may be above one bara, or above 10 bara, or above 50 bara.

The barrier comprises four vertical walls 1, 2, 3, 4 forming four sides of a parallelepiped attached to a base S to define a rectangular-section space that is intended to contain the industrial equipment E arranged on the base S. This figure shows the walls 1, 2 having the same height. The wall 4 would form the back of the section, but is not shown. The four vertical walls 1, 2, 3, 4 are made of reinforced concrete or another suitable material (steel, cement, concrete) and have a height of at least 2.4 m. The section shows the walls 1, 2 defining the length of the space, the walls 3, 4 defining the width W thereof. The length-to-width ratio can take any value. The parallelepipedal space between the walls 1, 2, 3, 4 and the base is partially closed at the top by a partial roof T1 attached to three of the vertical walls 1, 3, 4. The roof T1 is a plate, made of reinforced concrete or any other suitable material (steel, cement, concrete) and has a rectangular surface parallel to the base S and perpendicular to the walls 1, 2, 3, 4, the surface of the partial roof T1 corresponding to at most half of the rectangular section of the space formed by the four walls 1, 2, 3, 4. The width of the plate of the roof T1 is $W_1$ and its length is that of the walls 1, 2. The partial roof is positioned above the equipment E, leaving an open space of width $W_A$ and of length equal to that of the walls 1, 2.

$W_1$ is equal to at most 50% of W and $W_A$ is equal to at most 50% of W. Next to the barrier there is an industrial apparatus B on which a person can work. The figure shows that the barrier is dimensioned in such a way that the cone covered by the fragments or the fire from the equipment E cannot hit the person or the apparatus B. In this case, the industrial equipment is on the same base S, but this is not essential. The apparatus B may be a distillation column or a storage unit, and in this case is taller than the barrier, that is to say taller than at least 2.4 m.

The base S does not necessarily extend beyond the barrier and the apparatus can be located on another base.

Figure 2:
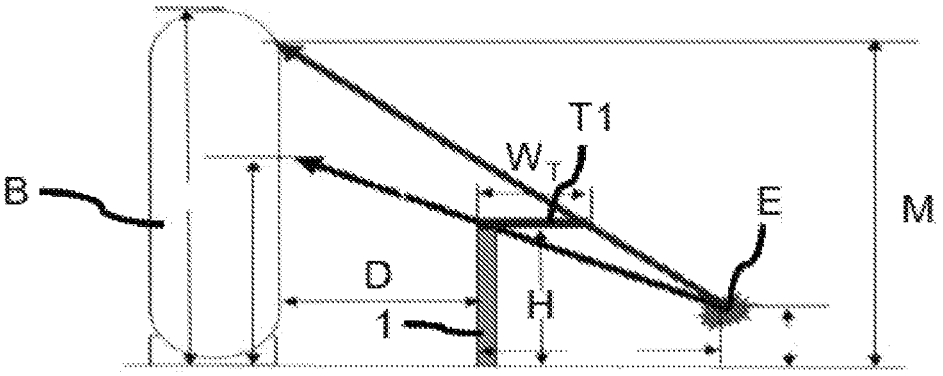
FIG. 2 shows a section through a protective barrier for an item of industrial equipment.

An operator can act on the equipment using the handles that pass through a wall of the barrier. This means that the operator remains outside the barrier, FIG. 2 shows in greater detail the distance D between the wall 1 of the barrier of height H and the apparatus B. Without the presence of the partial roof T1 of width $W_T$, the fire and/or the fragments coming from E would reach a region of the apparatus B below the height M. The wall 2 is not depicted, in order to simplify the drawing.

Figure 3:
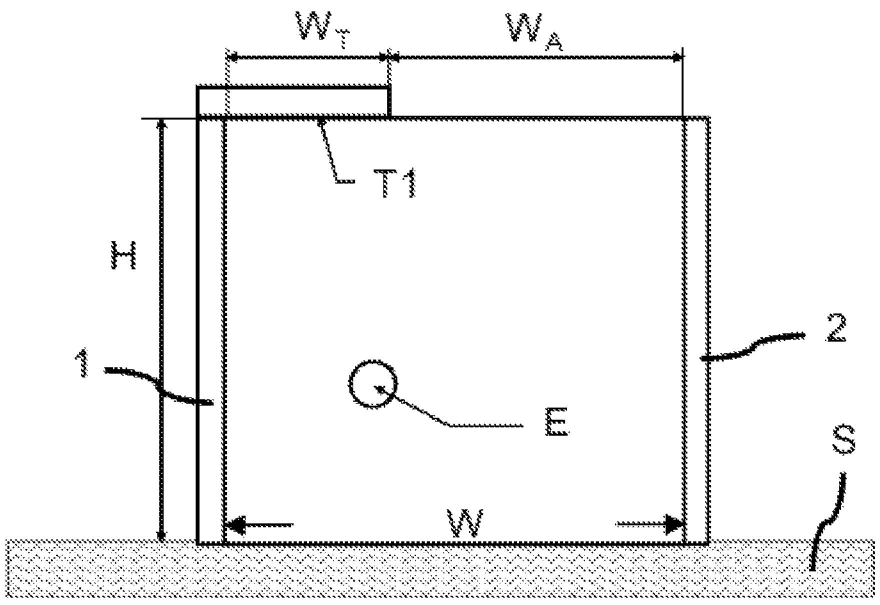
FIG. 3 shows a section through a protective barrier for an item of industrial equipment.

FIG. 3 shows the same section as FIG. 1, but seen in the other direction with the wall 3 at the back.

Figure 4:
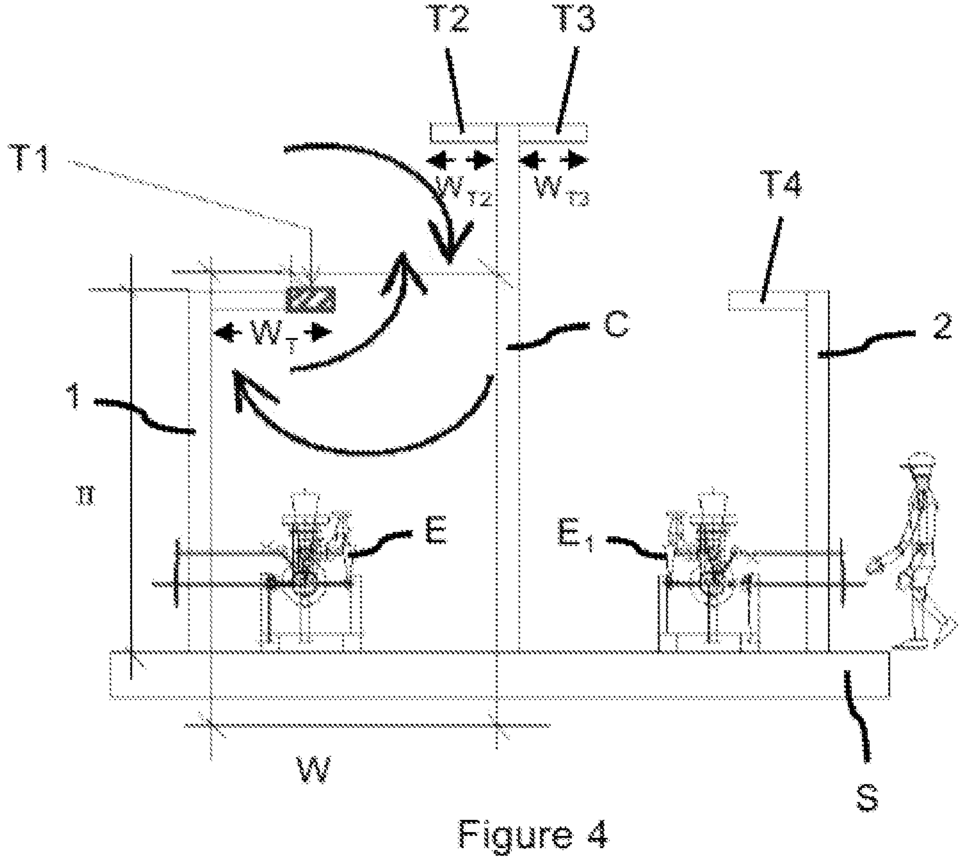
FIG. 4 shows a section through another protective barrier for an item of industrial equipment according to the invention.

FIG. 4 shows a section through a protective barrier for four items of industrial equipment, of which two are shown here: E, $E_1$. The items of industrial equipment may be traversed by the same combustible fluid (gas or liquid), or liquid or gaseous oxygen, or may be traversed by different fluids (combustible or oxygen). They may also process the fluid in question. The equipment may be chosen from the following non-exhaustive list: a compressor, a pump, a valve, a duct or a storage unit. The pressure(s) of the fluid(s) in question may be above one bars, or above 10 bars, or above 50 bara.

The barrier comprises four vertical walls 1, 2, 3, 4 forming four sides of a parallelepiped, attached to a base S and divided by partitions C so as to define a rectangular-section space divided into four identical or non-identical compartments that are intended to each contain one item of industrial equipment E. Each one of these compartments is considered to form a barrier for the equipment that it contains. This figure shows the walls 1, 2 having the same height. The four vertical walls 1, 2, 3, 4 are made of reinforced concrete or another suitable material and have a height H of at least 2.4 m. The section shows the walls 1, 2 defining the length of the space, the walls 3, 4 defining the width 2W thereof. The length-to-width ratio can take any value.

Between the two walls 1, 2 there is a vertical partition C of the same length as —but taller than—the walls 1, 2, Thus, the figure shows two of the compartments, one for the item of equipment E and one for the item of equipment E1. One person can operate on the equipment, in this case E1 by acting on the links passing through the wall, in this case the wall 2.

Each one of the compartments has a width W and a length equal to half of the length of the walls 1, 2.

The parallelepipedal space between the walls 1, 2, 3, 4 and the base is partially closed at the top by four partial roofs T1, T2, T3, T4. The partial roof T1 is attached to three of the vertical walls 1, 3, 4. The roof T1 is a plate, made of reinforced concrete or another suitable material and has a rectangular surface parallel to the base S and perpendicular to the walls 1, 2, 3, 4, the surface area of the partial roof T1 corresponding to the rectangular section of the space formed by the four walls 1, 2, 3, 4. The width of the plate of the roof T1 is $W_T$ and its length is that of the walls 1, 2. This partial roof is positioned above the equipment E, leaving an open space of width $W_A$ and of length equal to that of the walls 1, 2.

$W_1$ is equal to at most 50% of W and $W_A$ is equal to at most 50% of W.

The roof T1 is a plate, made of reinforced concrete or another suitable material and has a rectangular surface parallel to the base S and perpendicular to the walls 1, 2, 3, 4, the surface area of the partial roof T1 corresponding to at most one-quarter of the rectangular section of the space formed by the four walls 1, 2, 3, 4. The width of the plate of the roof T1 is $W_T$ and its length is that of the walls 1, 2. This partial roof is positioned above the equipment E, leaving an open space of width $W_A$ and of length equal to that of the walls 1, 2, passing all the way through two compartments.

$W_1$ is equal to at most 50% of W and $W_A$ is equal to at most 50% of W.

The roof T2 is a plate, made of reinforced concrete or another suitable material and has a rectangular surface parallel to the base S and perpendicular to the walls 1, 2, 3, 4 and the partition C, the surface area of the partial roof T2 corresponding to at most one-quarter of the rectangular section of the space formed by the four walls 1, 2, 3, 4 and at most half of the rectangular section of the compartment formed by the partitions and two of the walls. The width of the plate of the roof T2 is $W_{T2}$ and its length is that of the walls 1, 2, The partial roof T2 is attached to the top of the partition C, parallel to the walls 1, 2, This partial roof T2 is not located above the item of equipment E.

$W_1$ is equal to at most 50% of W and $W_A$ is equal to at most 50% of W.

The offset positioning of the partial roofs T2, T1 forces the air to enter the barrier, descending along the partition and circulating around the equipment E, thus improving ventilation of the equipment E.

Conversely, on the other side of the partition, a partial roof T3 is attached above the compartment where the equipment E1 is located. A partial roof T4 extends from the top of the wall 2 above the equipment E1.

As indicated, the presence of the taller partial roofs T2, T3 can make it possible to reduce the size of the partial roofs T1, T4. In this case, the partial roofs T1, T4 are longer than the partial roofs T2, T3.

In this case in which the two roofs T1, T2 and T3, T4 form chicanes, it is important that the two partial roofs do not overlap, in order to leave enough space for air to move.

For example, the vertical separation F between two roofs covering part of a single space is between 20 cm and 2 m. The horizontal separation D between the free ends of the two roofs corresponds to between 25% and 75% of the width W.

The roof T1 is attached to the wall 1 and optionally to the walls 3, 4 and/or to the partitions C, C° if present, but not to the wall 2, The roofs T2 and T3 are attached only to the partition C. The roof T4 is attached to the wall 2 and optionally to the walls 3, 4 and/or to the partitions C, C°.

According to a simplified version, the partition C can simply be taller than the walls 1, 2, and can have no partial roof, the simple effect of this difference in height being able to improve ventilation.

Figure 5:
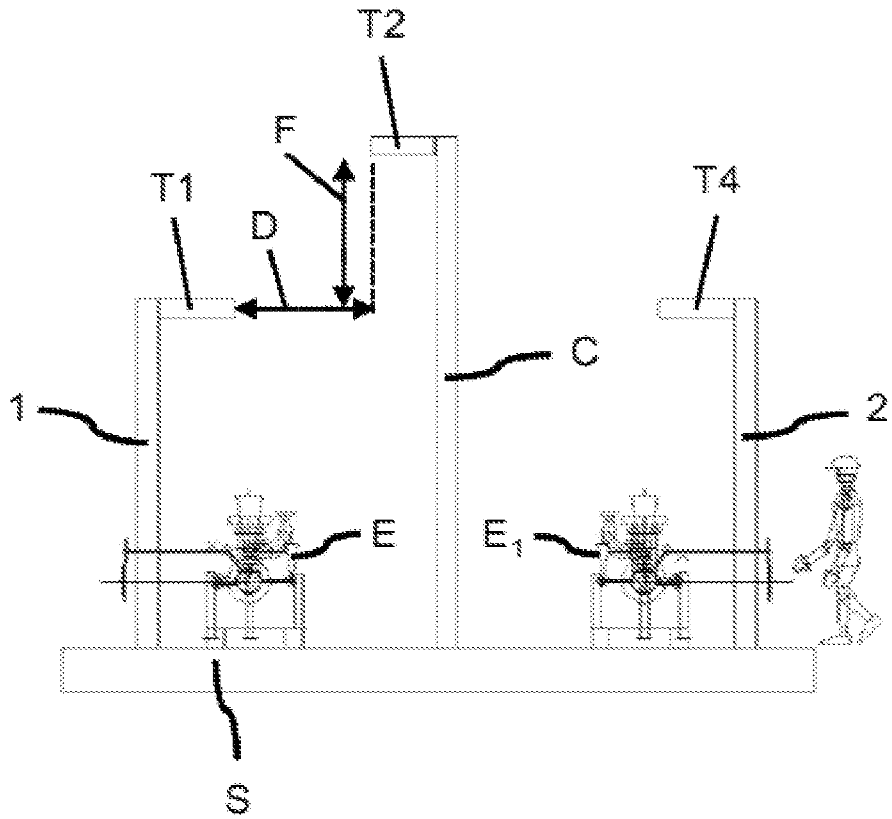
FIG. 5 shows a section through another protective barrier for an item of industrial equipment according to the invention.

FIG. 5 shows that the presence of the roof T3 in FIG. 4 is not essential.

The roof T1 is attached to the wall 1 and optionally to the walls 3, 4 or to the partitions C, C4 if present, but not to the wall 2. The roof T2 is attached only to the partition C.

Figure 6:
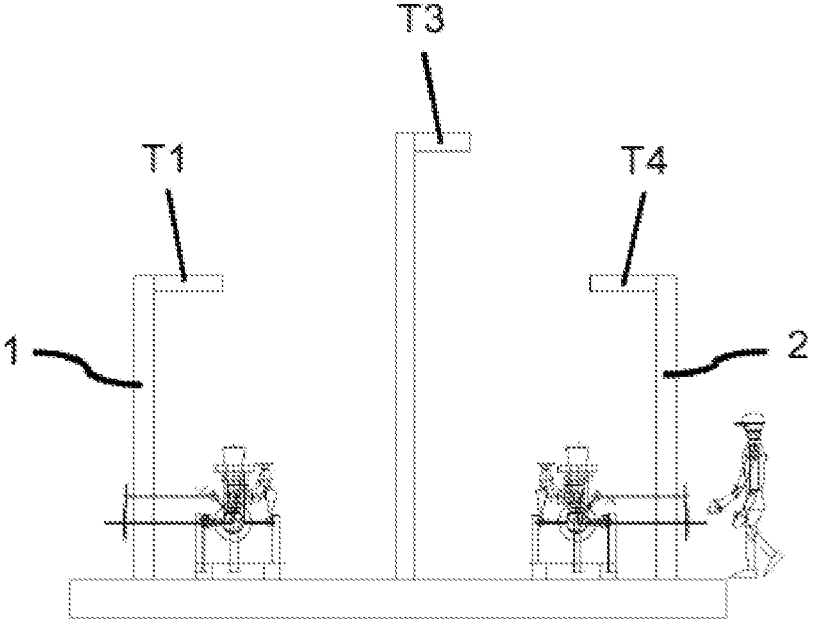
FIG. 6 shows a section through another protective barrier for an item of industrial equipment according to the invention.

FIG. 6 shows that the presence of the roof T2 in FIG. 4 is not essential. The roof T1 is attached to the wall 1 and optionally to the wads 3, 4 or to the partitions C, C4 if present, but not to the wall 2. The roof T3 is attached only to the partition C.

Figure 7:
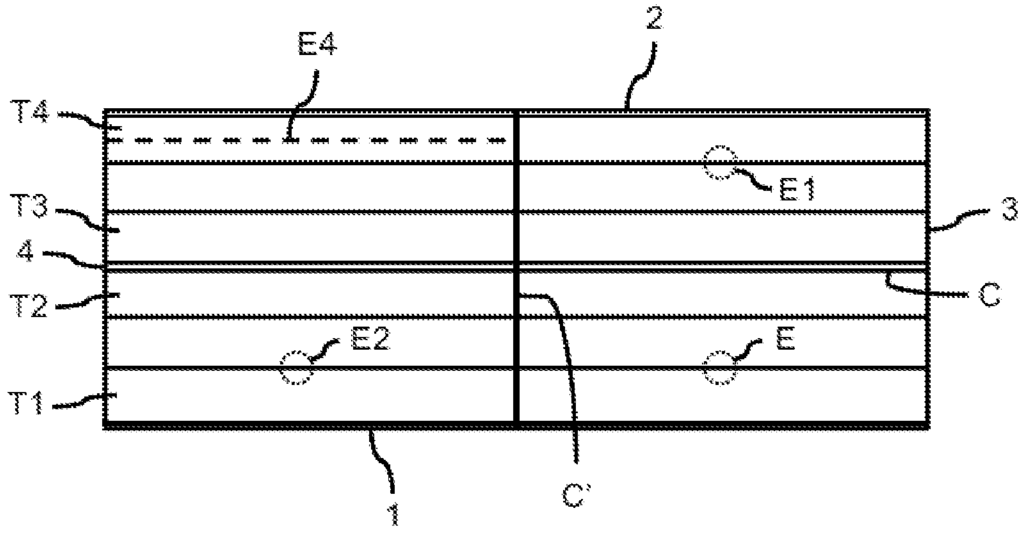
FIG. 7 shows a top view of a protective barrier from FIG. 4.

FIG. 7 shows a top view of the barrier of FIG. 4 with its four identical compartments and the two mutually perpendicular partitions C, C. The partition C is parallel to the walls 1, 2 and perpendicular to the walls 3, 4 and the partition C' is perpendicular to the walls 1, 2 and parallel to the walls 3, 4.

The barrier comprises four vertical walls 1, 2, 3, 4 forming four sides of a parallelepiped attached to a base S to define a rectangular-section space that is intended to contain the industrial equipment E, E1, E2, E3 arranged on the base. The length of this space is defined by the parallel walls 1, 2 and the width of this space is defined by the parallel walls 3, 4.

The parallelepipedal space between the walls 1, 2, 3, 4 and the base is partially closed at the top by a partial roof T1 attached to three of the vertical walls 1, 3, 4. The roof T1 is a plate, made of reinforced concrete or another suitable material and has a rectangular surface parallel to the base S and perpendicular to the walls 1, 2, 3, 4 of the walls 1, 2.

Figure 8:
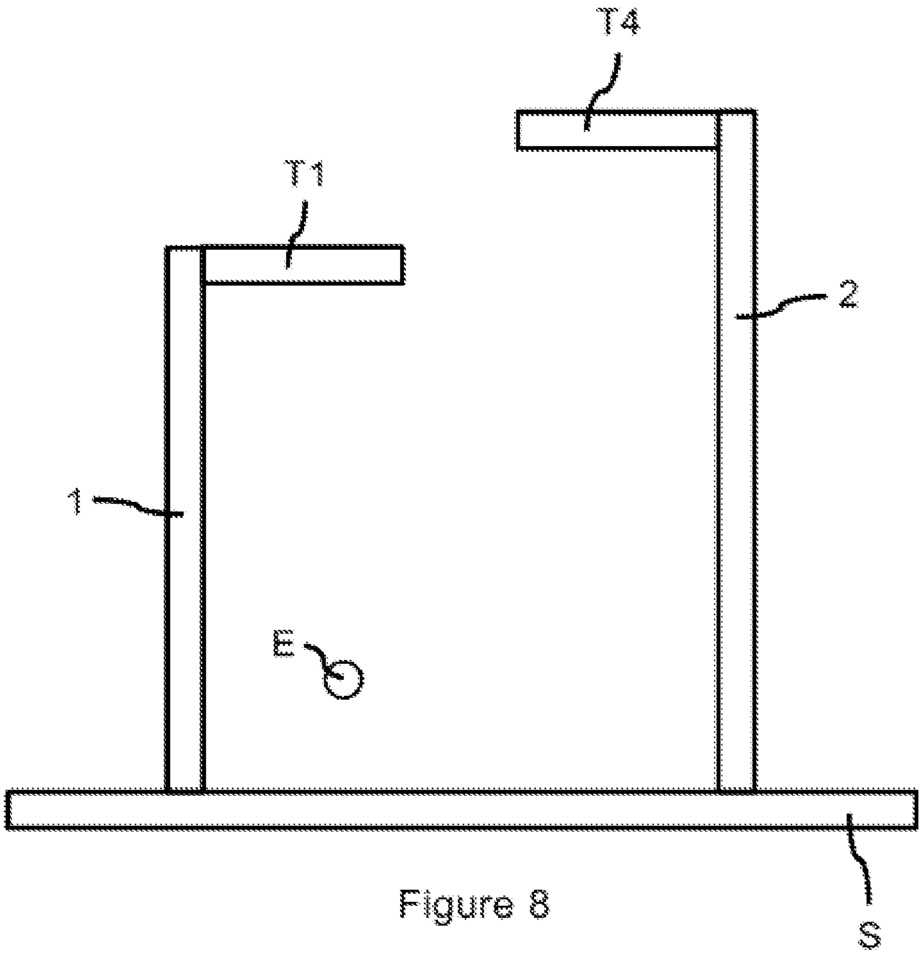
FIG. 8 shows a section through another protective barrier for an item of industrial equipment according to the invention.

Here, only one part of each item of equipment E1, E2, E is located directly beneath the partial roof T4, T1. Here, the item of equipment E4 is a duct located entirely beneath the partial roof T4, FIG. 8 shows a variant of the invention in which the barrier has no partition C but comprises four vertical walls 1, 2, 3, 4 forming four sides of a parallelepiped attached to a base S to define a rectangular-section space that is intended to contain the industrial equipment E arranged on the base. This figure shows that the walls 1, 2 are of unequal height, the wall 1 being shorter than the wall 2. The walls 1 and 3 are preferably of equal height. The wall 4 would form the back of the section, but is not shown. The four vertical walls 1, 2, 3, 4 are made of reinforced concrete or another suitable material and have a height of at least 2.4 m. The walls 1, 2 define the length of the space, the walls 3, 4 defining the width W thereof.

The equipment E is located at least partially beneath the roof T1, extending from the top of the wall 1. The equipment E is not beneath the roof T4 extending from the top of the wall 2, the roof T4 being at a higher level than the roof T1. Thus, as before, the roofs T1, T4 form chicanes that favour ventilation around the equipment.

The roof T1 is attached to the wall 1 and optionally to the walls 3, 4, but not to the wall 2. The roof T4 is attached only to the wall 2.

According to a simplified version, the wall 2 may simply be taller than the wall 1, and can have no partial roof, the simple effect of this difference in height being able to improve ventilation.

It will be understood that many additional changes in the details, materials, steps and arrangement of parts, which have been herein described in order to explain the nature of the invention, may be made by those skilled in the art within the principle and scope of the invention as expressed in the appended claims, Thus, the present invention is not intended to be limited to the specific embodiments in the examples given above.

What is claimed is:

1. A protective barrier for an item of industrial equipment that is traversed by and/or processes a combustible fluid or oxygen, comprising four vertical walls forming four sides of a parallelepiped, the four vertical walls being attached to a base so as to define a rectangular-section space that is configured to contain the industrial equipment arranged on the base, the four vertical walls having a height of at least 2.4 m and comprising at least two partial roofs attached to at least two of the four vertical walls, having a surface parallel to the base and extending over the space, the surface area of the at least two partial roofs being equal to at most 50% of a surface area corresponding to the rectangular section space, wherein a first wall of the four vertical walls is attached to a first partial roof of the at least two partial roofs, and a second wall of the four vertical walls is attached to a second partial roof of the at least two partial roofs, and the height of the second wall is greater than that of the first wall, the second wall being parallel to the first wall, wherein the first partial roof of the at least two partial roofs and the second partial roof of the at least two partial roofs do not overlap.

2. The protective barrier according to claim 1, comprising the industrial equipment arranged with at least in part a footprint below the at least two partial roofs.

3. The protective barrier according to claim 2, wherein the industrial equipment is entirely beneath at least one of the two partial roofs.

4. The protective barrier according to claim 1, comprising the industrial equipment contained in the rectangular section space, and wherein the industrial equipment is beneath only one of the at least two partial roofs.

5. The protective barrier according to claim 1, wherein at least 50% of the rectangular section space is uncovered.

6. The protective barrier according to claim 1, wherein the width of an open space of the protective barrier is greater than 0.75H, where H is the height of at least three walls of the four vertical walls.

7. The protective barrier according to claim 1, wherein the first and second partial roofs being above the rectangular section space formed by the four vertical walls.

8. The protective barrier according to claim 7, where the first partial roof is positioned at a lower height than the second partial roof.

9. The protective barrier according to claim 1, comprising the industrial equipment contained in the rectangular section space, where the industrial equipment is a compressor, a pump, a valve, a duct or a storage unit.

10. An installation comprising at least two protective barriers for an item of industrial equipment that is traversed by and/or processes a combustible fluid or oxygen, each comprising four vertical walls forming four sides of a parallelepiped, the four vertical walls being attached to a base so as to define a rectangular-section space that is configured a height of at least 2.4 m and comprising at least two partial roofs attached to at least one of the four vertical walls, having a surface area parallel to the base and extending over the rectangular section space, the surface area of the at least two partial roofs or the surface area of each of the at least two partial roofs being equal to at most 50% of the surface area corresponding to the rectangular section space, the at least two protective barriers having a common wall, each protective barrier being configured to contain an item of industrial equipment that is traversed by and/or processes the combustible gas or oxygen, the common wall being parallel to a wall of the four vertical walls of each of the at least two protective barriers and being higher than the wall to which it is parallel.

11. The installation according to claim 10, comprising two partial roofs attached to the common wall.

12. The installation according to claim 11, wherein the two partial roofs are at the same height.

13. The installation according to claim 10, comprising two items of industrial equipment, each in the rectangular section space of one of the two protective barriers.

* * * * *